United States Patent
Inose et al.

(10) Patent No.: US 12,318,866 B2
(45) Date of Patent: Jun. 3, 2025

(54) LASER WELDING METHOD FOR REPAIR, AND LASER WELDING REPAIR DEVICE

(71) Applicant: IHI Corporation, Tokyo (JP)

(72) Inventors: Koutarou Inose, Tokyo (JP); Naoyuki Matsumoto, Tokyo (JP); Daiki Okita, Tokyo (JP)

(73) Assignee: IHI Corporation, Tokyo (JP)

( * ) Notice: Subject to any disclaimer, the term of this patent is extended or adjusted under 35 U.S.C. 154(b) by 662 days.

(21) Appl. No.: 17/080,911

(22) Filed: Oct. 27, 2020

(65) Prior Publication Data

US 2021/0039201 A1 Feb. 11, 2021

Related U.S. Application Data

(63) Continuation of application No. PCT/JP2019/016008, filed on Apr. 12, 2019.

(30) Foreign Application Priority Data

Apr. 27, 2018 (JP) ................................. 2018-087297

(51) Int. Cl.
*B23K 26/34* (2014.01)
*B23K 26/03* (2006.01)
(Continued)

(52) U.S. Cl.
CPC ............ *B23K 26/34* (2013.01); *B23K 26/034* (2013.01); *B23K 26/073* (2013.01);
(Continued)

(58) Field of Classification Search
CPC .... B23K 26/34; B23K 26/034; B23K 26/073; B23K 26/0869; B23K 26/123; B23K 2103/04; E04G 23/0244
See application file for complete search history.

(56) References Cited

U.S. PATENT DOCUMENTS 5,196,672 A    3/1993  Matsuyama et al.
6,188,041 B1 * 2/2001  Kim ..................... B23K 26/034
                                                219/121.72
(Continued)

FOREIGN PATENT DOCUMENTS

JP    03-169494 A    7/1991
JP    04-272122 A    9/1992
(Continued)

OTHER PUBLICATIONS

Extended European Search Report dated Dec. 14, 2021 for European Patent Application No. 19791985.5.

*Primary Examiner* — John J Norton
*Assistant Examiner* — Theodore J Evangelista
(74) *Attorney, Agent, or Firm* — Volpe Koenig

(57) ABSTRACT

A laser welding repair device includes a laser oscillator, a laser head that condenses laser light from the laser oscillator to irradiate a repair portion, a temperature sensor that detects a temperature distribution of a steel material irradiated with the laser light, and a control unit. The control unit sets a spot diameter of the laser light to be less than 3 mm, moves the laser head and enlarges a heat input area to check for a crack in the heat input area, the heat input area being formed by irradiating the steel material with the laser light, and controls the laser head to irradiate a region where a temperature detected by the temperature sensor is equal to or less than a mechanical melting temperature of the steel material. Where a welding is performed in a flat position, the crack can be easily and reliably erased without causing burn through.

6 Claims, 5 Drawing Sheets

(51) Int. Cl.
    *B23K 26/073*    (2006.01)
    *B23K 26/08*     (2014.01)
    *B23K 26/12*     (2014.01)
    *B23K 103/04*    (2006.01)
    *E04G 23/02*     (2006.01)

(52) U.S. Cl.
    CPC ........ B23K 26/0869 (2013.01); B23K 26/123 (2013.01); E04G 23/0244 (2013.01); *B23K 2103/04* (2018.08)

(56) References Cited

U.S. PATENT DOCUMENTS

| | | |
|---|---|---|
| 6,341,936 B1 | 1/2002 | Cowie et al. |
| 7,094,988 B1 | 8/2006 | Taylor |
| 2005/0067065 A1* | 3/2005 | Fernihough ............. B23P 6/007 148/512 |
| 2007/0170158 A1* | 7/2007 | Greig ................. B23K 26/0869 219/121.64 |
| 2010/0032413 A1* | 2/2010 | Brenner ............. B23K 20/1275 219/76.1 |
| 2014/0197143 A1 | 7/2014 | Burbaum et al. |

FOREIGN PATENT DOCUMENTS

| | | | |
|---|---|---|---|
| JP | 06-088120 A | | 3/1994 |
| JP | 06-335792 A | | 12/1994 |
| JP | 07-075893 A | | 3/1995 |
| JP | 2001-287062 A | | 10/2001 |
| JP | 2015024440 A | * | 2/2015 |
| JP | 5860264 B2 | | 2/2016 |
| JP | 6196561 B2 | | 9/2017 |
| WO | 97/26388 A2 | | 7/1997 |

* cited by examiner $H_{WL}/t<1$ $H_{WL}/t\geqq 1$

LASER WELDING METHOD FOR REPAIR, AND LASER WELDING REPAIR DEVICE

TECHNICAL FIELD

The present disclosure relates to a laser welding method for repair and a laser welding repair device that are suitable for use in repairing a crack generated in a structural member of an existing structure such as a bridge or a building, or a machine component such as a machine part.

BACKGROUND ART

It is known that in a case where a crack is generated in a steel material (a structural member) of an existing structure such as a bridge or a building due to deterioration over time or metal fatigue, for example, a welding repair device using laser light is employed to irradiate a welding repair portion where the crack is generated with laser light. Consequently, this welding repair portion is molten to erase the crack (see Patent Document 1).

For repair of the above described crack generated in the structural member, it is first required that the crack is not left. Therefore, in a case where the crack is eliminated with the above described welding repair device, laser light having a comparatively large spot diameter (from $\phi 3$ to 7 mm) is moved along the crack.

RELATED ART DOCUMENT

Patent Document

Patent Document 1: Japanese Patent No. 5860264

SUMMARY OF THE DISCLOSURE

Problems to be Solved by the Disclosure

In the above described conventional welding repair device, however, laser light of large output has to be used, or a movement speed of a laser spot has to be slowed down to compensate for decrease in energy density due to an increased spot diameter of the laser light.

Furthermore, in the conventional welding repair device, in a case where the laser light of the large output is used or the movement speed of the laser spot is slowed down as described above, burn through easily occurs during welding in so-called flat position to apply the laser light downward.

That is, in the above described conventional welding repair device using the laser light, in the case of the welding in the flat position, there is a problem that it is not easy to perform the welding without leaving any cracks or causing the burn through, and solving such a problem is a conventional issue.

The present disclosure has been developed to solve such a conventional problem as described above, and an object of the present disclosure is to provide a laser welding method for repair and a laser welding repair device in which decrease in required laser output and high speed operation are achieved, and additionally a crack can be easily and reliably erased without causing any burn through even if a welding is performed in a flat position.

Means for Solving the Problems

In order to achieve the above object, a first aspect of the present disclosure is directed to a laser welding method for repair of melting and erasing a crack generated in a structural member of an existing structure, the method comprising moving laser light having a spot diameter of less than 3 mm and enlarging a heat input area so as for the crack to be located within the heat input area, the heat input area being formed by irradiating the structural member with the laser light, and to enlarge the heat input area, irradiating, with the laser light, a region where a temperature detected by a temperature sensor is equal to or less than a mechanical melting temperature of the structural member, or a region where a temperature equal to or less than the mechanical melting temperature of the structural member is obtained, after elapse of a cooling time acquired as data in advance.

Here, "the mechanical melting temperature" is a temperature at which yield strength of the structural member that is lowered by heating is lost. When the member is cooled by heat dissipation after operation, at this temperature or less, the yield strength of the structural member recovers.

In the present disclosure, the spot diameter is set to be less than 3 mm, because high energy density is to be obtained. If the spot diameter is excessively small, the movement of the laser light to enlarge the heat input area within which the crack is located increases (it becomes difficult to trace the crack), and practicality is impaired. Consequently, it is desirable to employ a practical spot diameter.

In the laser welding method for repair according to the first aspect of the present disclosure, when repairing the crack generated in the structural member, the laser light having the spot diameter of less than 3 mm is moved and the heat input area formed by irradiating the structural member with the laser light is enlarged so as for the crack to be located within the heat input area. Consequently, welding repair can be easily performed without leaving the crack. Even if the repair welding is performed in a flat position, the laser light has the spot diameter of less than 3 mm, and hence a range where a temperature is simultaneously equal to or more than the mechanical melting temperature is small. As a result, burn through can be avoided.

Effects of the Disclosure

According to the present disclosure, a laser welding method for repair is very effective in that decrease in required laser output and high speed operation are achieved, and additionally a crack can be easily and reliably erased while avoiding burn through even if the repair welding is performed in a flat position.

MODE FOR CARRYING OUT THE DISCLOSURE

Hereinafter, one embodiment of the present disclosure will be described with reference to the drawings.

Figure 1:
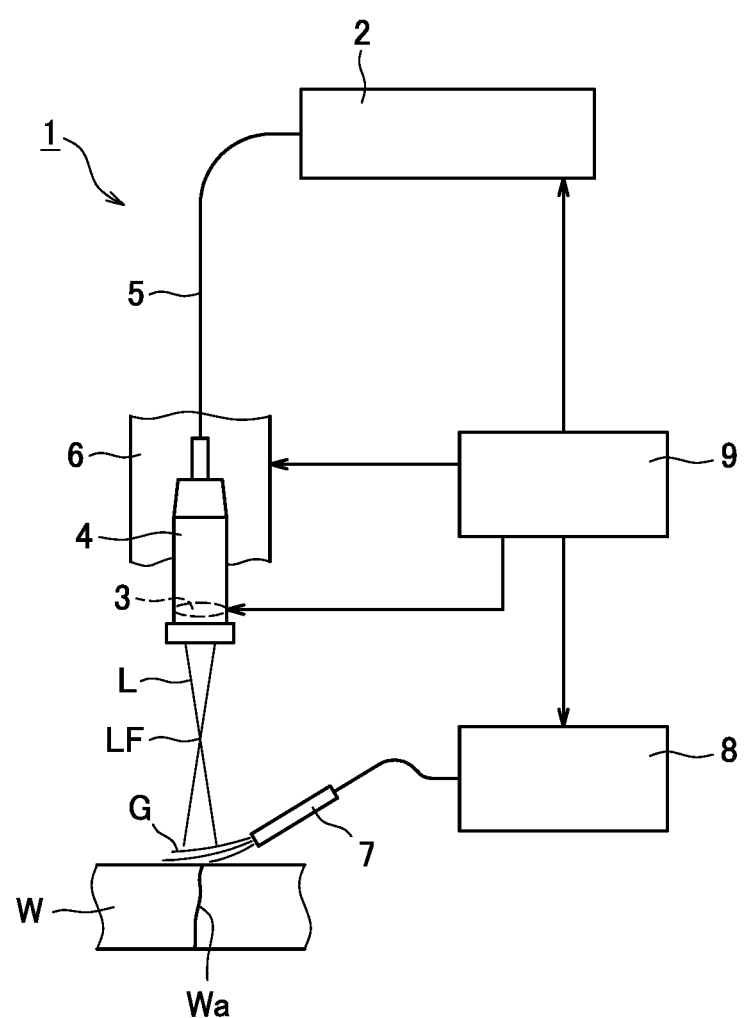
FIG. 1 is a schematic view schematically explaining a laser welding repair device for use in a laser welding method for repair according to one embodiment of the present disclosure.

FIG. 1 shows a laser welding repair device for use in a laser welding method for repair according to one embodiment of the present disclosure.

As schematically shown in FIG. 1, a laser welding repair device 1 melts and erases a crack Wa generated in a steel material (structural member) W of an existing structure. The laser welding repair device 1 includes a laser oscillator 2, a laser head 4 that condenses laser light L supplied from the laser oscillator 2 with an optical system 3 contained in this head to irradiate a repair portion where the crack Wa is generated, an optical fiber 5 that guides the laser light L from the laser oscillator 2 to the laser head 4, a drive unit 6 that moves the laser head 4 along the repair portion and moves the head close to and away from the repair portion, an unshown temperature sensor that detects a temperature distribution of the steel material W irradiated with the laser light L, and a gas supply source 8 that supplies, via a nozzle 7, shielding gas G to the repair portion to be irradiated with the laser light L.

Furthermore, the laser welding repair device 1 is provided with a control unit 9 that controls a spot diameter of the laser light L applied from the laser head 4, the movement of the laser head 4 by the drive unit 6, an amount of the gas to be supplied from the gas supply source 8, or the like. The control unit 9 controls the laser head 4 so that a focus LF of the laser light L is located outside the steel material W, and controls the laser head 4 so that a spot diameter $\phi$ of the laser light L, with which the repair portion where the crack Wa is generated is irradiated, is less than 3 mm.

In this case, the control unit 9 gives a command to the drive unit 6 to move the laser head 4 so as for the crack Wa to be located within a heat input area formed by irradiating the steel material W with the laser light L having the spot diameter $\phi$ of less than 3 mm, to enlarge the heat input area.

Figure 2A:
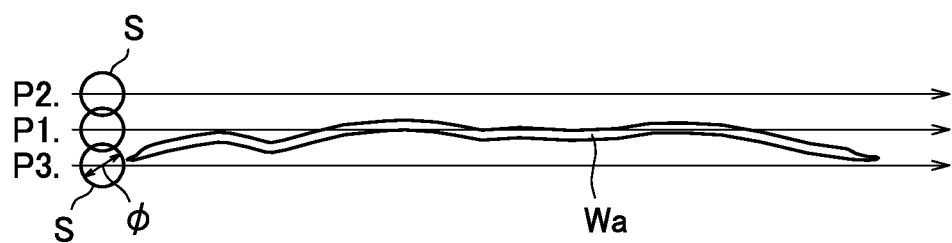
FIG. 2A is a pass trajectory explanatory view in moving laser light along a crack three times in a case of performing crack repair with the laser welding repair device of FIG. 1.

Specifically, in this embodiment, the laser head 4 is moved to pass (move) a laser spot S (the laser light L) having the spot diameter $\phi$ of less than 3 mm along the crack Wa of the steel material W three times as shown in FIG. 2A, thereby enlarging the heat input area. Then, passes P2, P3 of subsequent second and third times among three passes P1 to P3 are performed on opposite sides of the first pass P1, so that respective peripheral edges of the laser spots S adjacent to each other are superimposed on each other. Consequently, crack remaining does not occur.

In this case, the temperature distribution of the steel material W is detected by the temperature sensor out of the drawing, and each of the passes P2, P3 subsequent to the pass P1 among the passes P1 to P3 of the laser spot S is controlled by the control unit 9 to be performed to a region where a temperature is equal to or less than a mechanical melting temperature of the steel material W. That is, the control unit 9 performs control such that a molten portion by the preceding pass is cooled to obtain a temperature equal to or less than the mechanical melting temperature, and then the subsequent pass is performed.

Here, a cooling time until the molten portion of the steel material W by the pass of the laser spot S obtains the temperature equal to or less than the mechanical melting temperature is acquired and accumulated as data in advance, and after elapse of this cooling time, the passes P2, P3 subsequent to the pass P1 may be performed to a region where the molten portion by the pass P1 obtains the temperature equal to or less than mechanical melting temperature of the steel material W.

Figure 2B:
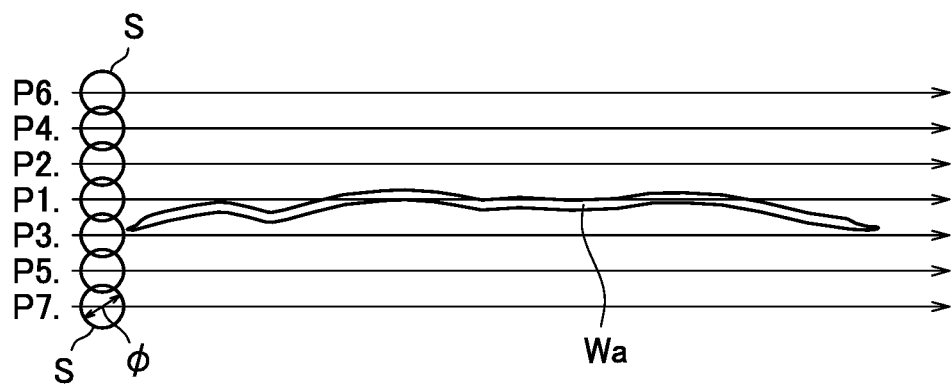
FIG. 2B is a pass trajectory explanatory view in moving laser light along the crack seven times in the case of performing the crack repair with the laser welding repair device of FIG. 1.

Note that a number of times to pass the laser spot S along the crack Wa of the steel material W is not limited to the above described three times to pass. For example, the number of the times to pass may be two or four to six. As shown in FIG. 2B, the laser spot S may be passed along the crack Wa of the steel material W seven times.

Also in this case, it is preferable that second and subsequent passes P2 to P7 among seven times of passes P1 to P7 may be performed alternately on the opposite sides of the first pass P1, and the respective peripheral edges of the laser spots S adjacent to each other are superimposed on each other, to prevent the crack remaining from occurring. That is, the control unit 9 performs the control such that the molten portion by the preceding pass is cooled to obtain the temperature equal to or less than the mechanical melting temperature, and then the subsequent pass is performed.

When repairing the crack Wa generated in the steel material W by use of the laser welding repair device 1 including such a configuration, the drive unit 6 is operated in response to the command from the control unit 9, to move the laser head 4. Furthermore, in response to the command from the control unit 9, supply of the shielding gas G from the gas supply source 8 is started.

At this time, the spot diameter $\phi$ of the laser light L applied from the laser head 4 is set to be less than 3 mm by the control unit 9, and the laser head 4 is moved to pass (move) the laser spot S (the laser light L) having the spot diameter $\phi$ of less than 3 mm along the crack Wa of the steel material W once, as shown in FIG. 2A.

If the crack Wa cannot be traced with one pass P1 of the laser spot S, the second and third passes P2, P3 are performed subsequently to the pass P1. These passes P2, P3 are performed on the opposite sides of the first pass P1, and the respective peripheral edges of the laser spots S that are adjacent to each other are superimposed on each other, to prevent the crack remaining from occurring.

Furthermore, based on the temperature distribution of the steel material W that is detected by the temperature sensor out of the drawing, the second and third passes P2, P3 are controlled by the control unit 9 to be performed after the molten portion by the preceding pass P1 is cooled to obtain the temperature equal to or less than the mechanical melting temperature, and by the three times of the passes P1 to P3 of the laser spot S, the crack Wa of the steel material W is erased to complete welding repair.

According to the laser welding method for repair and the laser welding repair device 1 according to this embodiment, the laser spot S having the spot diameter $\phi$ of less than 3 mm is passed three times and the heat input area formed by irradiating the steel material W with the laser light L is enlarged so as for the crack Wa to be located within the heat input area, which facilitates the welding repair without causing the crack remaining. Furthermore, as in this embodiment, also in a case of repair welding in a flat position, the spot diameter φ of the laser light L is less than 3 mm, and hence a range where a temperature is simultaneously equal to or more than the mechanical melting temperature is small. As a result, burn through can be avoided.

In this case, since the laser light L with which the steel material W is irradiated is laser light having the spot diameter φ of less than 3 mm and having high energy density, small laser output is only required, and additionally, operation can be performed at high speed.

Furthermore, the control unit 9 performs control, based on temperature information detected by the temperature sensor, so that the molten portion by the preceding pass is cooled to obtain the temperature equal to or less than the mechanical melting temperature, and then the subsequent pass is performed. Consequently, generation of a region where yield strength does not recover in the repair portion is avoided.

Furthermore, in the laser welding method for repair and the laser welding repair device 1 according to this embodiment, when the laser spot S having the spot diameter φ of less than 3 mm is passed along the crack Wa three times, the second and third passes P2, P3 among the passes P1 to P3 are performed on the opposite sides of the first pass P1. Therefore, unlike a case where the passes P1, P2, and P3 are superimposed to be arranged in order, it does not have to be waited until the molten portion by the preceding pass obtains the temperature equal to or less than mechanical melting temperature, and an operation time can be accordingly shortened.

Thus, to confirm an operation margin (a range of a heat input Q into the repair portion) of crack repair by the laser welding method for repair and the laser welding repair device 1 according to this embodiment, laser welding is performed on welding operation conditions corresponding to repair conditions in a case where excellency is determined based on a shape coefficient.

Figure 3A:
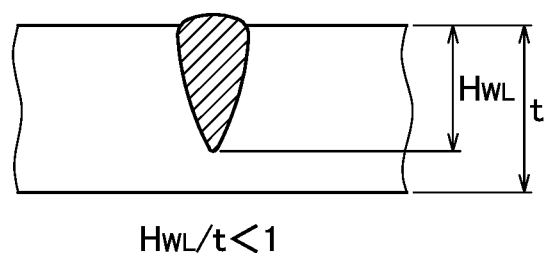
FIG. 3A is a shape coefficient explanatory view in a cross-sectional shape in which insufficient melting occurs which causes crack remaining in the case of performing the crack repair with the laser welding repair device of FIG. 1.
Figure 3B:
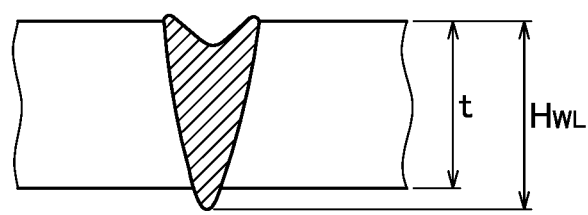
FIG. 3B is a shape coefficient explanatory view in a cross-sectional shape that may avoid the insufficient melting which causes crack remaining in the case of performing the crack repair with the laser welding repair device of FIG. 1.

The above shape coefficient is represented by dividing a melting depth $H_{WL}$ in a cross-sectional shape after the welding operation by a thickness t of the steel material W, and this shape coefficient ($H_{WL}/t$) is smaller than 1.0 in the cross-sectional shape indicating insufficient melting which causes crack remaining shown in FIG. 3A. The shape coefficient ($H_{WL}/t$) is set preferably to 1.0 or more as in a cross-sectional shape that avoids the insufficient melting shown in FIG. 3B, and more preferably to about 1.1.

Figure 4:
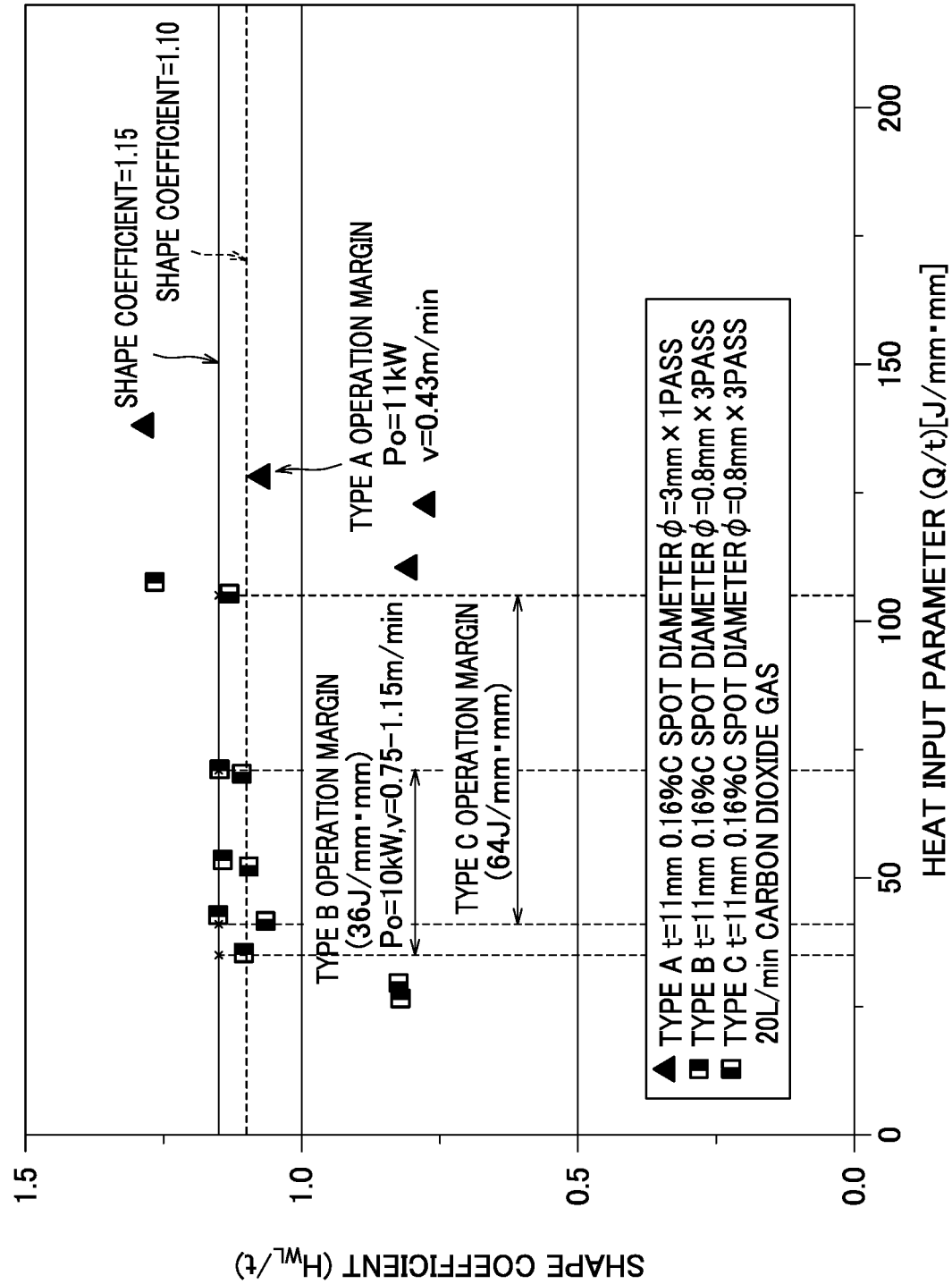
FIG. 4 is a graph for use in confirming a welding operation margin in the case of performing the crack repair with the laser welding repair device of FIG. 1.

As shown in a graph of FIG. 4 showing a relation between the shape coefficient ($H_{WL}/t$) and a heat input parameter (Q/t) [J/mm·mm], a shape coefficient of a preferable cross-sectional shape after the welding operation is 1.15 ($H_{WL}/t$) ≥1.00 in a type B (the spot diameter φ=0.8 mm×3 passes, without the shielding gas) and a type C (the spot diameter φ=0.8 mm×3 passes, with the shielding gas) in the laser welding for repair according to this embodiment. In this case, the operation margin with which the shape coefficient is within 1.15 ($H_{WL}/t$)≥1.00 is 36 J/mm·mm in the type B, and the operation margin with which the shape coefficient is similarly within 1.15 ($H_{WL}/t$)≥1.00 is 64 J/mm·mm in the type C. It is seen that a range of conditions of the operation is broad in each type.

On the other hand, in a type A (the spot diameter φ=3.0 mm×1 pass, without the shielding gas) of laser welding for repair performed as a comparative example, there is only one point at which the shape coefficient is within 1.15 ($H_{WL}/t$)≥1.00. It is seen that the operation margin (an adequate range of conditions of the operation) is noticeably small. Consequently, it can be verified that the range of conditions of the operation is broad in the laser welding method for repair according to this embodiment.

In this case, in comparison of the type B in which the shielding gas is not present with the type C in which the shielding gas is present, it is seen that the melting is less in the type C in which the shielding gas is present. Therefore, it is seen that fine adjustment of the cross-sectional shape can be performed by heat removal with the shielding gas during the welding operation.

Figure 5:
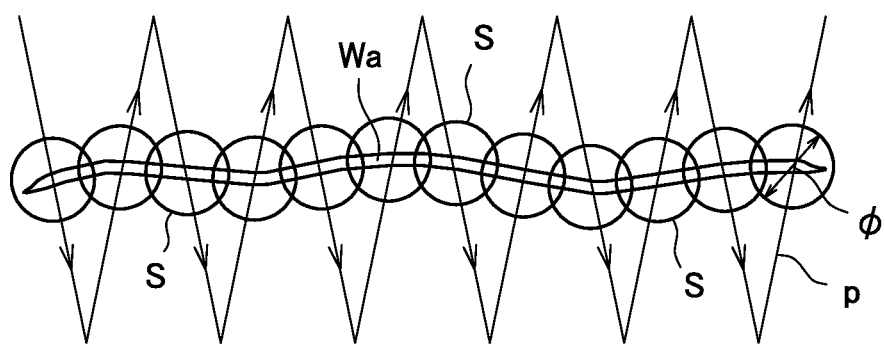
FIG. 5 is a pass trajectory explanatory view in weaving the laser light so that the light straddles the crack in the case of performing the crack repair with the laser welding repair device of FIG. 1.
Figure 6:
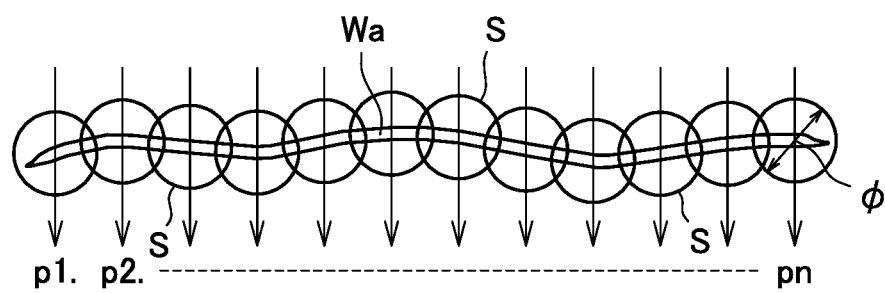
FIG. 6 is a pass trajectory explanatory view in causing the laser light to straddle the crack a plurality of times in the case of performing the crack repair with the laser welding repair device of FIG. 1.

In the above described embodiment, it has been described a case where the laser spot S having the spot diameter φ of less than 3 mm is passed along the crack Wa three times (seven times), but the present disclosure is not limited to this example. In another pass pattern, as shown in FIG. 5, in case of performing repair of the crack Wa, the laser spot S may be moved (woven) as if drawing zigzag pass p to straddle the crack Wa, or as shown in FIG. 6, in case of performing the repair of the crack Wa, the laser spot S may be finely moved as in passes p1 to pn to straddle the crack Wa a plurality of times.

The configurations of the laser welding method for repair and the laser welding repair device according to the present disclosure are not limited to the above described embodiment, and can be variously modified without departing from scope of the disclosure.

A laser welding method for repair according to a first aspect of the present disclosure is a laser welding method for repair of melting and erasing a crack generated in a structural member of an existing structure, the method comprising moving laser light having a spot diameter of less than 3 mm and enlarging a heat input area so as for the crack to be located within the heat input area, the heat input area being formed by irradiating the structural member with the laser light, and to enlarge the heat input area, irradiating, with the laser light, a region where a temperature detected by a temperature sensor is equal to or less than a mechanical melting temperature of the structural member, or a region where a temperature equal to or less than the mechanical melting temperature of the structural member is obtained, after elapse of a cooling time acquired as data in advance.

In the first aspect of the present disclosure, when repairing the crack generated in the structural member, the laser light having the spot diameter of less than 3 mm is moved and the heat input area formed by irradiating the structural member with the laser light is enlarged so as for the crack to be located within the heat input area. Consequently, welding repair can be easily performed without leaving the crack. Even if the repair welding is performed in the flat position, the laser light has the spot diameter of less than 3 mm, and hence the range where the temperature is simultaneously equal to or more than the mechanical melting temperature is small. As a result, the burn through can be avoided.

In this case, since the laser light with which the structural member is irradiated is the laser light having the spot diameter of less than 3 mm and having the high energy density, the small laser output is only required, and additionally, the operation can be performed at the high speed.

Furthermore, the region where the temperature detected by the temperature sensor is equal to or less than the mechanical melting temperature of the structural member, or the region where the temperature is equal to or less than the mechanical melting temperature of the structural member is obtained after the elapse of the cooling time acquired as the data in advance is irradiated with the laser light to enlarge the heat input area. Consequently, generation of a region where the yield strength does not recover and the burn through occurs in the repair portion can be avoided.

Furthermore, in a second aspect of the present disclosure, the laser light having the spot diameter of less than 3 mm may be passed along the crack a plurality of times, and the heat input area within which the crack is located may be enlarged. In the second aspect of the present disclosure, the occurrence of the crack remaining can be avoided.

Additionally, in a third aspect of the present disclosure, among the plurality of times to pass the laser light along the crack, second and subsequent passes may be alternately performed on opposite sides of a trajectory of a first pass.

In the third aspect of the present disclosure, unlike the case where the passes are superimposed to be arranged in order, it does not have to be waited until the molten portion by the preceding pass obtains a temperature equal to or less than the mechanical melting temperature, and hence the operation time can be accordingly shortened.

Furthermore, in a fourth aspect of the present disclosure, shielding gas may be supplied to the region irradiated with the laser light, and in the fourth aspect of the present disclosure, the fine adjustment of the cross-sectional shape can be performed by the heat removal with the shielding gas.

On the other hand, a laser welding repair device according to a fifth aspect of the present disclosure is the laser welding repair device that melts and erases a crack generated in a structural member of an existing structure, comprising a laser oscillator, a laser head that moves while irradiating the structural member with laser light supplied from the laser oscillator, a temperature sensor that detects a temperature distribution of the structural member irradiated with the laser light, and a control unit that controls a spot diameter of the laser light applied from the laser head and the movement of the laser head, wherein the control unit sets the spot diameter of the laser light applied from the laser head to be less than 3 mm, moves the laser head and enlarges a heat input area so as for the crack to be located within the heat input area, the heat input area being formed by the irradiation with the laser light, and controls the laser head to irradiate a region where a temperature detected by the temperature sensor is equal to or less than a mechanical melting temperature of the structural member with the laser light to enlarge the heat input area.

In the fifth aspect of the present disclosure, when repairing the crack generated in the structural member, the laser light having the spot diameter of less than 3 mm is moved and the heat input area formed by irradiating the structural member with the laser light is enlarged so as for the crack to be located within the heat input area. Consequently, welding repair can be easily performed without leaving the crack. Even if the repair welding is performed in the flat position, the laser light has the spot diameter of less than 3 mm, and hence the range where the temperature is simultaneously equal to or more than the mechanical melting temperature is small. As a result, the burn through can be avoided.

In this case, since the laser light with which the structural member is irradiated is the laser light having the spot diameter of less than 3 mm and having the high energy density, the small laser output is only required, and additionally, the operation can be performed at the high speed. In addition, the region where the temperature detected by the temperature sensor is equal to or less than the mechanical melting temperature of the structural member is irradiated with the laser light to enlarge the heat input area. Consequently, the generation of the region where the yield strength does not recover and the burn through occurs in the repair portion can be avoided.

In the laser welding method for repair and the laser welding repair device of the present disclosure, fiber laser, YAG laser or semiconductor laser is generally used as laser, but the laser is not limited to these examples.

EXPLANATION OF REFERENCE SIGNS 1 laser welding repair device
2 laser oscillator
4 laser head
8 gas supply source
9 control unit
G shielding gas
L laser light
P and P1 to P7 pass
p and p1 to pn pass
S laser spot (laser light)
W steel material (structural member)
Wa crack
φ spot diameter

The invention claimed is:

1. A laser welding method for repair of melting and erasing a crack generated in a structural member of an existing structure, the method comprising:
    moving a laser light to a heat input area that surrounds the crack, wherein the laser light has a spot diameter of less than 3 mm irradiating, with the laser light, a first region within the heat input area;
    adjusting a cross-sectional shape of the first region by controlling cooling of the first region using a shielding gas, wherein the cross-sectional shape of the first region is adjusted to maintain a shape coefficient that is 1.0 or greater and equal or less than 1.15;
    irradiating, with the laser light, a second region within the heat input area after a temperature of a portion of the first region cools to less than or equal to a mechanical melting temperature of the structural member, wherein the portion cools from a molten state that resulted from being irradiated with the laser light.

2. The laser welding method for repair according to claim 1, further comprising:
    irradiating, with the laser light, a third region within the heat input area when a temperature of the second region cools to less than or equal to the mechanical melting temperature of the structural member.

3. The laser welding method for repair according to claim 2, wherein the first region abuts the second and the third region.

4. The laser welding method for repair according to claim 1, wherein the shape coefficient is 1.1.

5. A laser welding repair device that melts and erases a crack generated in a structural member of an existing structure, comprising:
    a laser oscillator;
    a shielding gas supply;
    a laser head that moves while irradiating the structural member with laser light supplied from the laser oscillator;
    a temperature sensor that detects a temperature distribution of the structural member irradiated with the laser light; and
    a control unit that is communicatively coupled to the temperature sensor and controls the laser oscillator, the laser head and the shielding gas supply, wherein the control unit is configured to:

set a spot diameter of the laser light applied from the laser head to be less than 3 mm, move the laser head to a heat input area that surrounds the crack, control the laser head to irradiate a first region within the heat input area, control the shielding gas supply to adjust a cross-sectional shape of the first region via cooling of the first region, wherein the cross-sectional shape of the first region is adjusted to maintain a shape coefficient that is 1.0 or greater and equal or less than 1.15, control the laser head to irradiate a second region within the heat input area after a temperature detected by the temperature sensor of a portion of the first region cools to or less than or equal to a mechanical melting temperature of the structural member, wherein the portion cools from a molten state that resulted from being irradiated with the laser light.

6. The laser welding repair device of claim 5, wherein the shape coefficient is 1.1.

\* \* \* \* \*